United States Patent
Bang et al.

(10) Patent No.: US 6,843,584 B2
(45) Date of Patent: Jan. 18, 2005

(54) BACKLIGHT DEVICE AND METHOD OF FABRICATING THE SAME

(75) Inventors: Ju Young Bang, Seoul (KR); Jong Hyun Choi, Incheon-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 39 days.

(21) Appl. No.: 10/329,353

(22) Filed: Dec. 27, 2002

(65) Prior Publication Data

US 2003/0231512 A1 Dec. 18, 2003

(30) Foreign Application Priority Data

Jun. 14, 2002 (KR) .............................. P10-2002-0033252

(51) Int. Cl.⁷ .............................................. F21V 21/00
(52) U.S. Cl. ........................ 362/249; 362/225; 362/260
(58) Field of Search .......................... 362/29, 560, 561, 362/225, 260, 249, 217, 221

(56) References Cited

U.S. PATENT DOCUMENTS

| | | | | |
|---|---|---|---|---|
| 5,567,042 A | * | 10/1996 | Farchmin et al. | ........... 362/241 |
| 6,331,064 B1 | * | 12/2001 | Nishiyama et al. | ......... 362/260 |
| 6,527,414 B2 | * | 3/2003 | Moon | .......................... 362/249 |
| 2002/0021564 A1 | * | 2/2002 | Cho et al. | ...................... 362/97 |
| 2003/0035283 A1 | * | 2/2003 | Lim | ............................. 362/97 |

* cited by examiner

Primary Examiner—Y. My Quach-Lee
Assistant Examiner—Peggy A. Neils
(74) Attorney, Agent, or Firm—Morgan, Lewis & Bockius LLP

(57) ABSTRACT

A backlight device includes a plurality of fluorescent lamps each having a tube and lamp electrodes formed at opposing ends of the tube arranged parallel with each other along a first direction, a lower lamp fixing assembly of a first height having a first plurality of grooves disposed along a second direction for holding the ends of the plurality of fluorescent lamps, and an upper lamp fixing assembly of a second height, the upper lamp fixing assembly having a second plurality of grooves, a first end portion have a first width facing the lower lamp fixing assembly, and a second end portion having a second width smaller than the first width, wherein portions of the ends of each of the tubes are exposed at an exterior of the lower and upper lamp fixing assemblies.

35 Claims, 15 Drawing Sheets

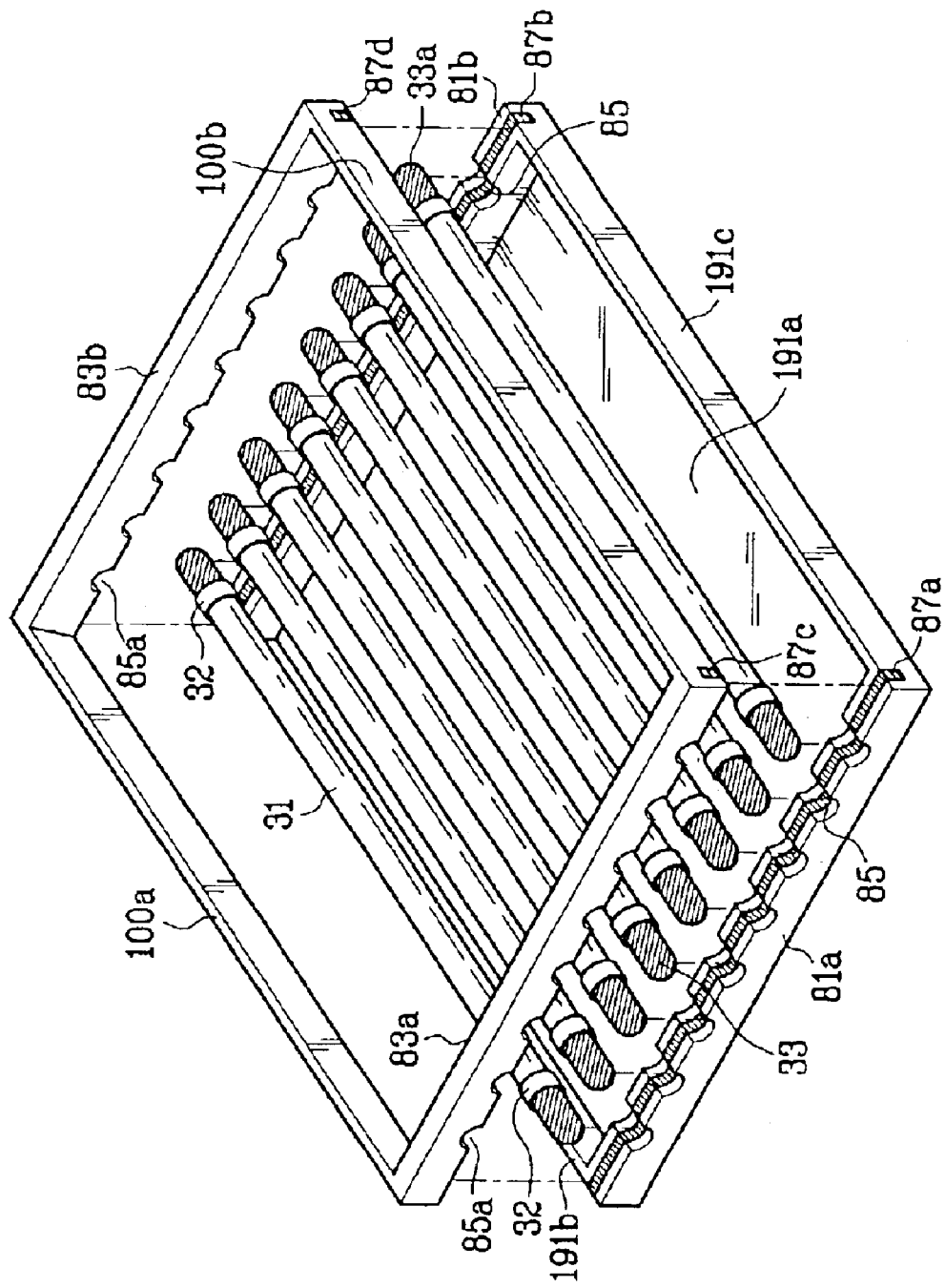

BACKLIGHT DEVICE AND METHOD OF FABRICATING THE SAME

The present invention claims the benefit of the Korean Application No. P2002-33252 filed in Korea on Jun. 14, 2002, which is hereby incorporated by reference.

BACKGROUND OF THE INVENTION

1. Field of the Invention

The present invention relates to a backlight device and a method of fabricating the same, and more particularly, to a direct-type backlight device and a method of fabricating the same for a liquid crystal display.

2. Discussion of the Related Art

In general, cathode ray tubes (CRTs) are commonly employed as display devices for televisions, ATM machines, and information terminals. However, CRTs fail to meet the current trend of miniature light weight electronic products due to their size and weight. Thus, efforts have been made to study and develop various types of display devices as substitutions for CRTs, such as liquid crystal display (LCD) devices, plasma display panels (PDPs), electro-luminescence display (ELD) devices, and vacuum fluorescent displays (VFDs). For example, LCD devices have been actively developed as flat display panels in laptop computers, desktop computers, and large-sized information displays because of their high quality image, light weight, small thickness, compact size, and low power consumption. Most LCD devices are passive devices in which images are displayed by controlling an amount of light input from an outside light source. Thus, a separate light source (backlight device) is generally employed for irradiating a LCD.

There are two types of backlight device, an edge light-type and a direct-type, based upon arrangement of the cylindrical fluorescent lamp within the device. An edge light-type backlight device has a lamp unit installed at a side portion of a light guiding plate for guiding light. Further, the lamp unit includes a lamp for emitting light, a lamp holder inserted at both ends of the lamp for protecting the lamp, and a lamp reflective plate for enclosing an outer circumference of the lamp, such that the reflective plate reflects the light generated from the lamp toward the light guiding plate. Alternatively, lamp units can be installed at opposing side portions of the light guiding plate to form a dual edge light-type backlight device, such that if one lamp unit fails to turn ON, the luminance of the screen is lowered, but an image can still be displayed as a whole on a LCD panel. Moreover, the edge light-type backlight devices are commonly employed in small-sized LCD devices of laptop computer and desktop computers because they produce uniform light having high endurance.

A direct-type backlight device has a plurality of lamps arranged in series to directly irradiate an entire surface of a LCD panel. The direct-type backlight devices are mainly used in large-sized LCD devices (20 inches or more), and have higher efficiency of light usage and longer operational lifetime than the edge light-type backlight devices. However, LCD devices employing the direct-type backlight device are more susceptible to a failed lamp, such that if one lamp unit fails, the portion where the lamp is not turned ON becomes remarkably dark and a portion of an image may be lost on a LCD panel. Accordingly, the lamps of the direct-type backlight devices are frequently replaced.

FIG. 1 is a perspective view of an edge light-type backlight device according to the related art, and FIG. 2 is a perspective view of a connector connected with a fluorescent lamp of an edge light-type backlight device according to the related art. In FIG. 1, an edge light-type backlight device of a LCD includes a plurality of fluorescent lamps 1, an outer case 3 for fixedly supporting the fluorescent lamps 1, and a light scattering system 5a, 5b, and 5c arranged between the fluorescent lamps 1 and the LCD panel (not shown). The light scattering system 5a, 5b, and 5c prevents the shape of the fluorescent lamps 1 from appearing on a display surface of the LCD panel, and uniformly distribute light generated from the fluorescent lamps 1. The light scattering system 5a, 5b, and 5c includes a plurality of diffusion sheets and diffusion plates. Further, a reflective plate 7 is formed on an inner bottom surface of the outer case 3 to reflect the light generated from the fluorescent lamps 1 toward the display surface of the LCD panel, thereby maximizing the luminance of the LCD panel.

In FIG. 2, a fluorescent lamp 1 is a cold cathode fluorescent lamp having internal electrodes 2 and 2a at the ends thereof, such that the fluorescent lamp 1 emits light when a power is applied to the electrodes 2 and 2a. In FIG. 1, the ends of the fluorescent lamp 1 are inserted in openings formed at opposing faces of the outer case 3. Power incoming lines 9 and 9a are connected to the ends of the fluorescent lamp 1 and to a connector 11 for transferring a lamp driving power to the fluorescent lamp 1 from a driving circuit (not shown).

However, in the aforementioned backlight device, a connector is necessary for every fluorescent lamp, such that the interconnection of the plurality of fluorescent lamps becomes complicated. Also, to decrease the thickness of the backlight device, a further step of bending the power incoming lines is needed when the power incoming lines are connected to the connector, thereby increasing production time and production cost. Furthermore, an opening of the outer case has to be made to hold the fluorescent lamp and to expose the electrodes of the fluorescent lamp, thereby making maintenance and repair of the fluorescent lamp difficult. Moreover, the outer case confines an effective luminous area generated from light emitted from the fluorescent lamp, such that the effective luminous area is narrow and the luminance at an adjacent portion to ends of the fluorescent lamp becomes unstable.

SUMMARY OF THE INVENTION

Accordingly, the present invention is directed to a backlight device and a method of fabricating the same that substantially obviates one or more problems due to limitations and disadvantages of the related art.

An object of the present invention is to provide a backlight device adapted for enhancing the lamp efficiency by decreasing the non-luminous area.

Another object of the present invention is to provide a backlight device adapted for extending the life of the lamp by lengthening the lamp electrode part and lowering the driving voltage of the fluorescent lamp.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight device includes a plurality of fluorescent lamps each having a tube and lamp electrodes formed at opposing ends of the tube arranged parallel with each other along a first direction, a lower lamp fixing assembly of a first height having a first plurality of grooves disposed along a second direction for holding the ends of the plurality of fluorescent lamps, and an upper lamp fixing assembly of a second height, the upper lamp fixing assembly having a second plurality of grooves, a first end portion have a first width facing the lower lamp fixing assembly, and a second end portion having a second width smaller than the first width, wherein portions of the ends of each of the tubes are exposed at an exterior of the lower and upper lamp fixing assemblies.

In another aspect, a backlight device includes a plurality of fluorescent lamps arranged in parallel with each other along a first direction, each having a tube and lamp electrodes formed at opposite ends of the tube to form an effective luminous area, first and second lower lamp fixing assemblies arranged facing each other along a second direction at a first interval along the first direction corresponding to a length of the fluorescent lamps, each of the first and second lower lamp fixing assemblies have a first height and a first plurality of grooves for accommodating the opposite ends of the tubes, and first and second upper lamp fixing assemblies each having a second plurality of grooves for affixing and supporting each of the fluorescent lamps, each of the first and second upper lamp fixing assemblies have a second height, wherein the first and second upper lamp fixing assemblies are arranged at the first interval and each have a first end portion of a first width adjacent to one of the first and second lower lamp fixing assemblies and a second end portion of a second width smaller than the first width.

In another aspect, a method of fabricating a backlight device includes arranging opposite ends of a plurality of fluorescent lamps within a first plurality of grooves of a lower lamp fixing assembly, each of the fluorescent lamps have lamp electrodes formed at opposite ends, and arranging an upper lamp fixing assembly having a second plurality of grooves to face the lower lamp fixing assembly to affix the opposite ends of each of the fluorescent lamps into the first and second pluralities of grooves, wherein portions of each of the fluorescent lamp electrodes are exposed at an exterior of the upper and lower lamp fixing assemblies.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 8A is a perspective view of another exemplary direct-type backlight device according to the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
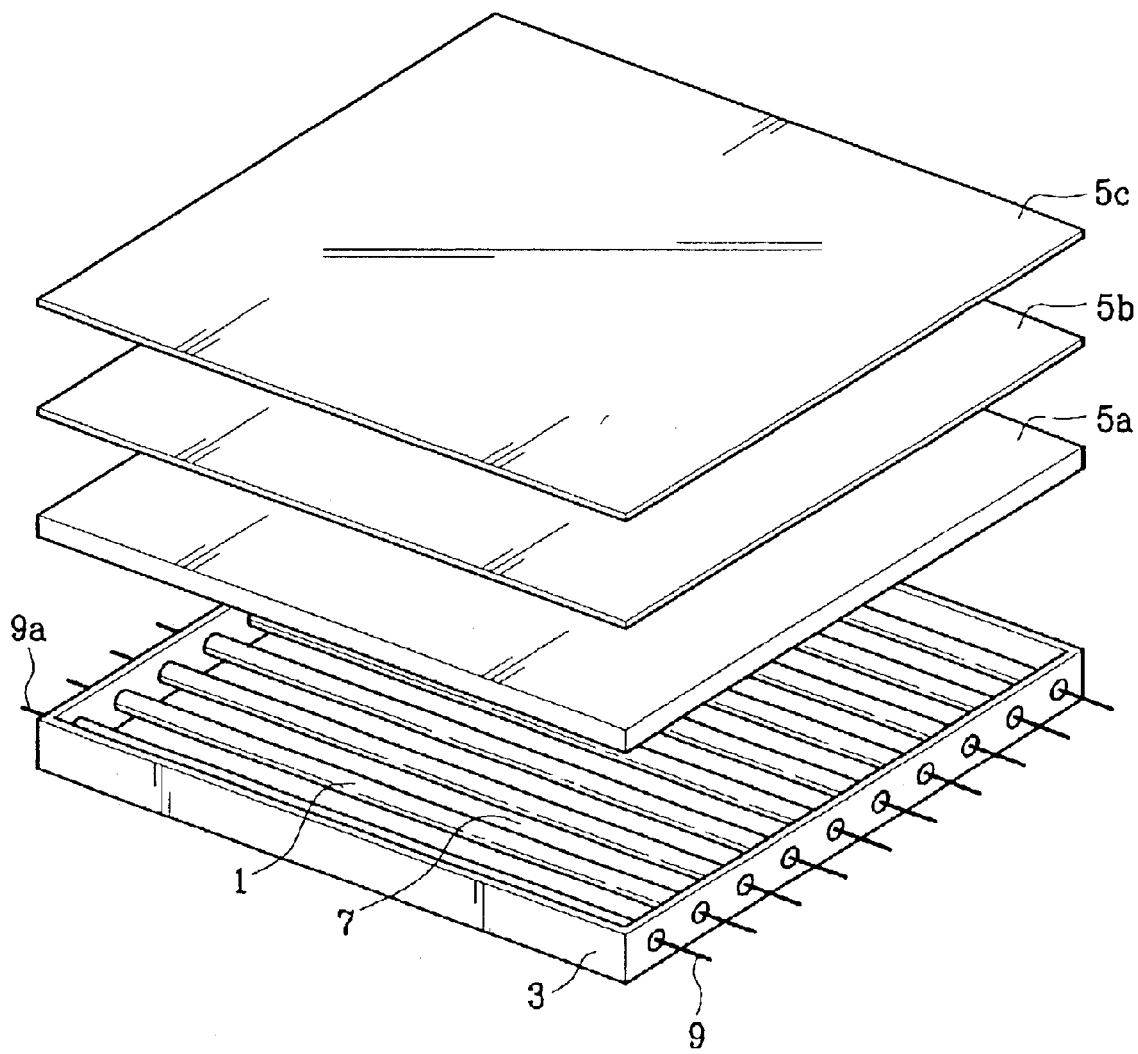
FIG. 1 is a perspective view of an edge light-type backlight device according to the related art.
Figure 2:
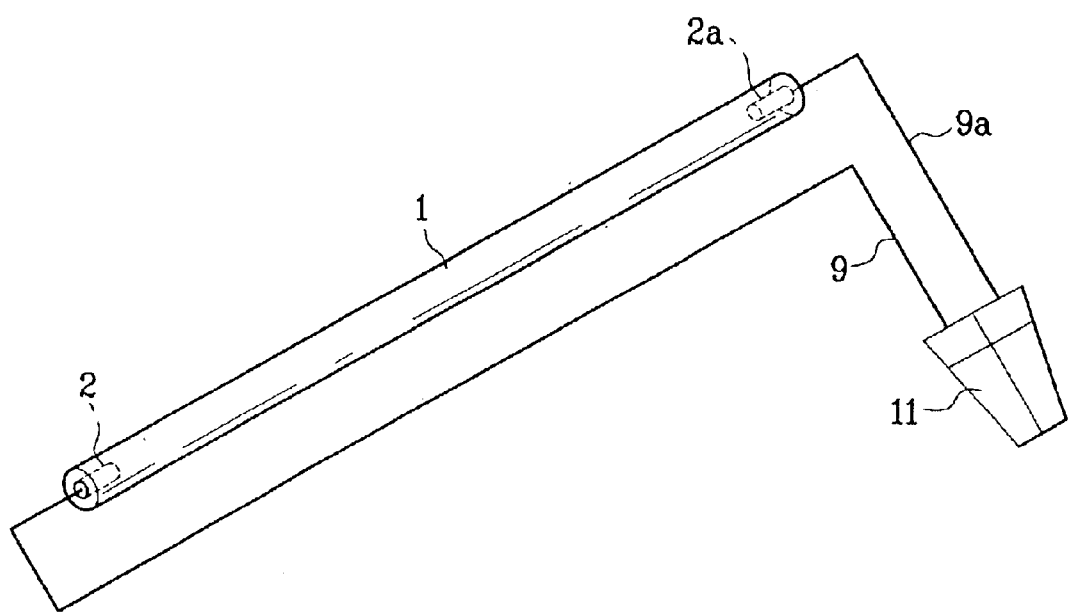
FIG. 2 is a perspective view of a connector connected with a fluorescent lamp of an edge light-type backlight device according to the related art.
Figure 3A:
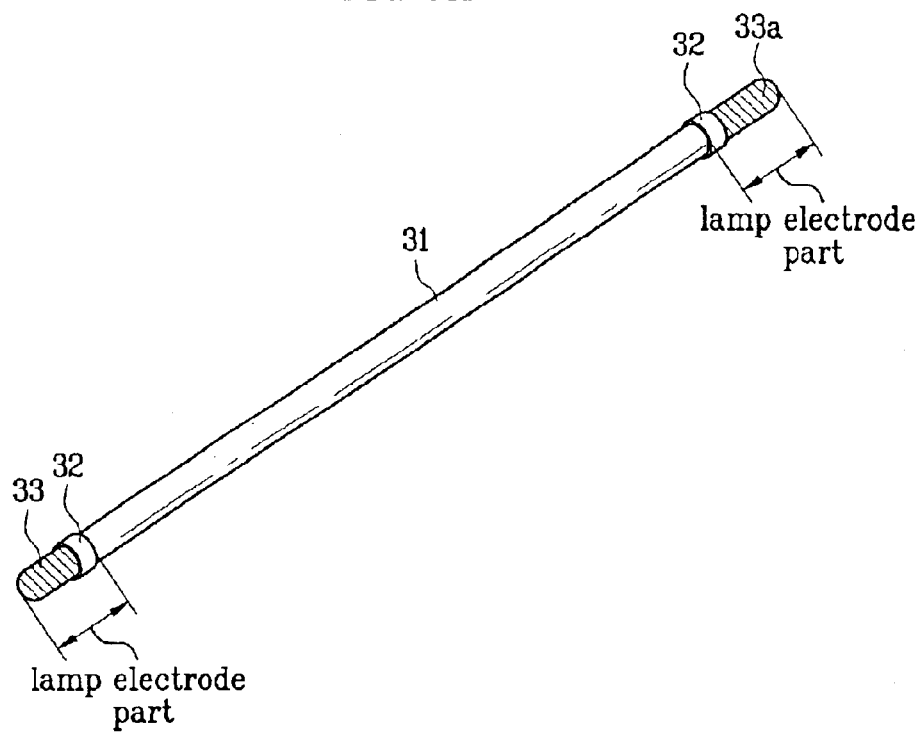
FIGS. 3A and 3B are perspective views of exemplary fluorescent lamps of a backlight device according to the present invention.
Figure 3B:
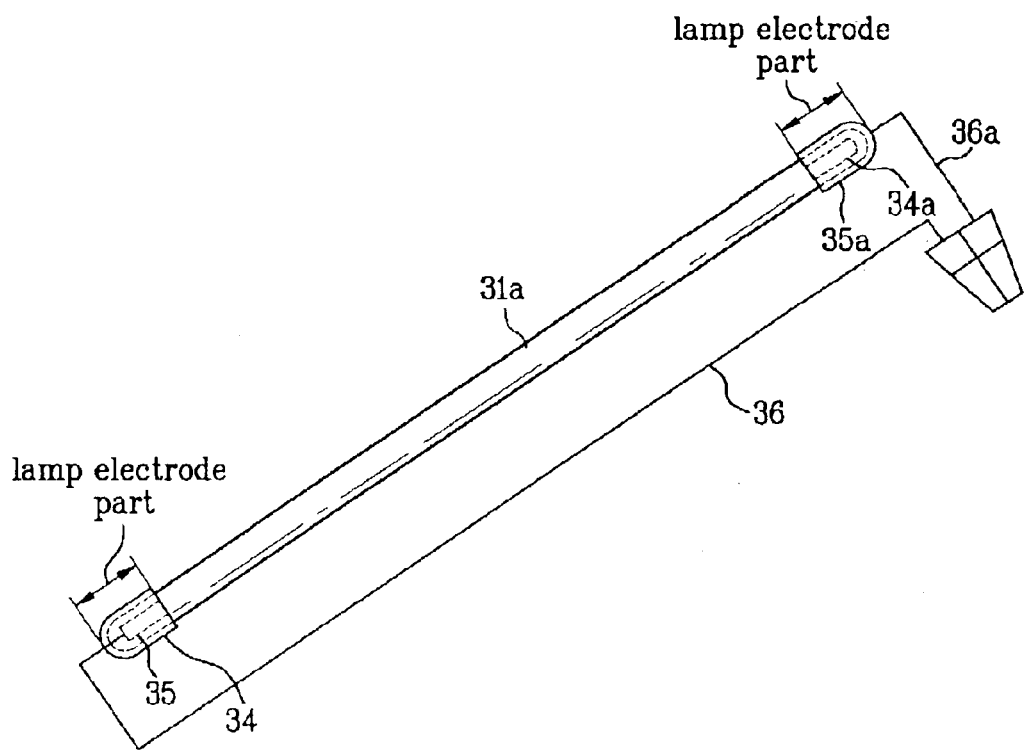

FIGS. 3A and 3B are perspective views of exemplary fluorescent lamps of a backlight device according to the present invention. In FIG. 3A, an external electrode fluorescent lamp (EEFL) 31 may have external electrodes 33 and 33a formed at both ends of the EEFL lamp 31, such that light is emitted when a power is applied to the external electrodes 33 and 33a. An insulating layer 32 may partially enclose the external electrodes 33 and 33a.

In FIG. 3B, a cold cathode fluorescent lamp (CCFL) 31a may have internal electrodes 34 and 34a at both ends of the CCFL lamp 31a, such that light is emitted when a power is applied to the internal electrodes 34 and 34a. In addition, lamp holders 35 and 35a may be formed at both ends of the CCFL lamps 31a for holding the internal electrodes 34 and 34a and the power incoming lines 36 and 36a.

Figure 4A:
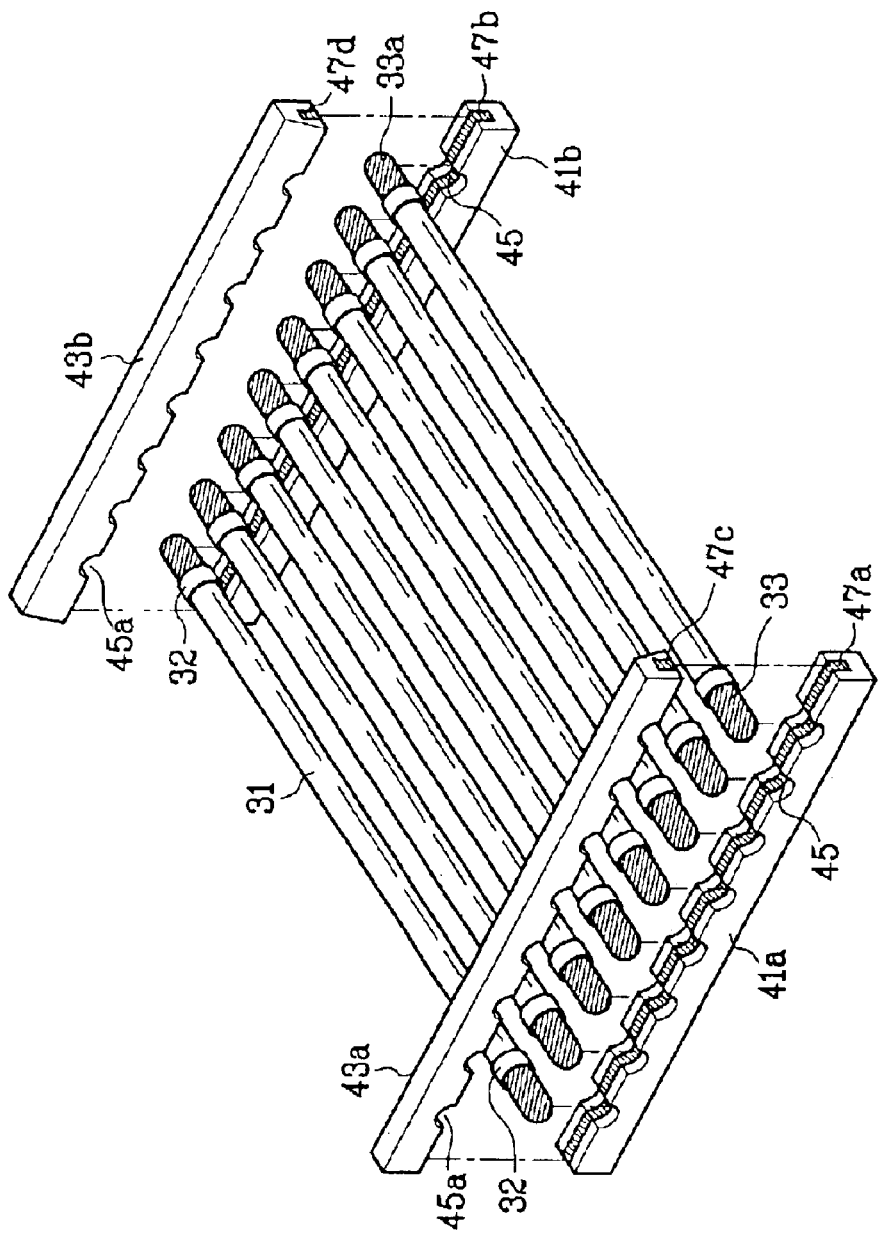
FIGS. 4A and 4B are perspective views of an exemplary direct-type backlight device according to the present invention.
Figure 4B:
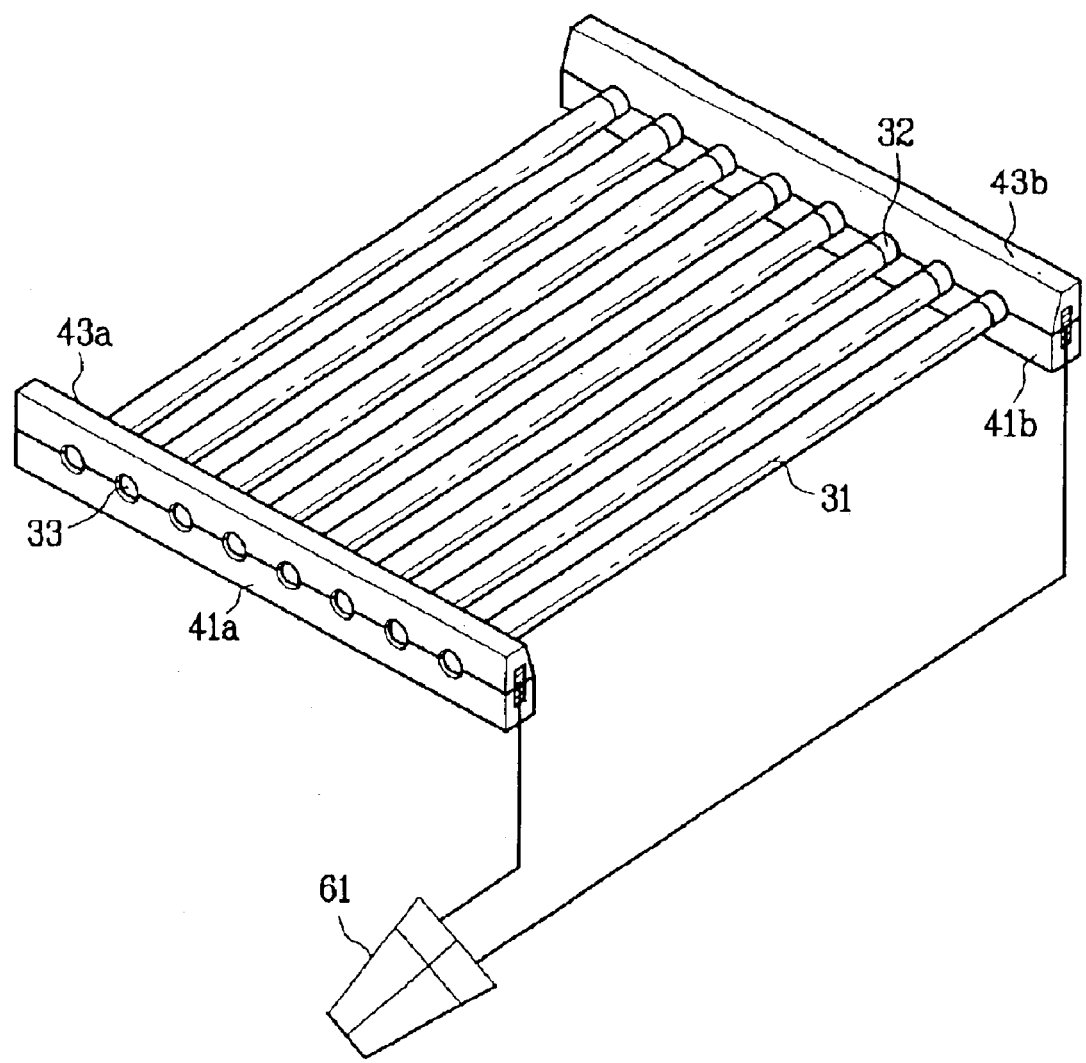
Figure 4C:
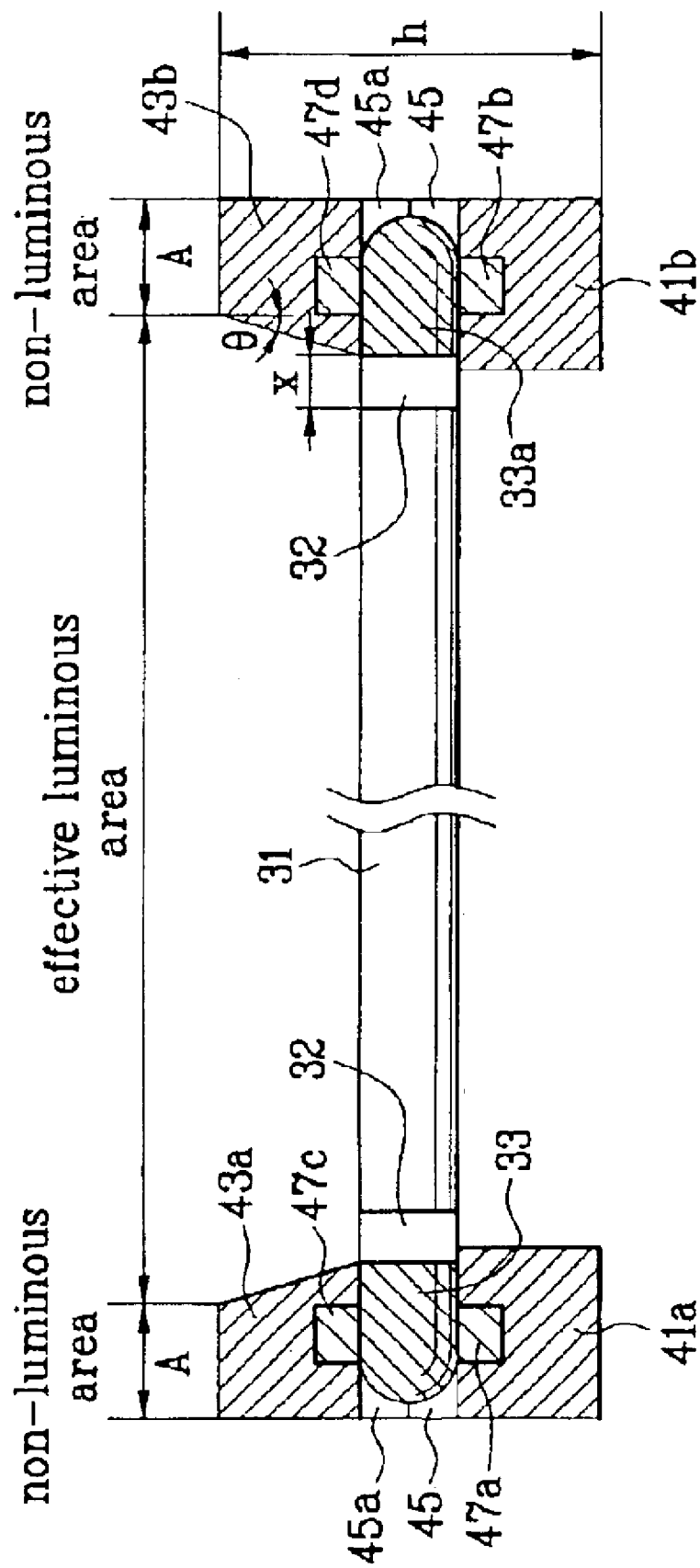
FIG. 4C is a cross-sectional view of the exemplary backlight device illustrated in FIG. 4B.

FIGS. 4A and 4B are perspective views of an exemplary direct-type backlight device according to the present invention, and FIG. 4C is a cross-sectional view of the exemplary backlight device illustrated in FIG. 4B. In FIG. 4A, a backlight device may include a plurality of fluorescent lamps 31 arranged parallel to each other, first and second lower lamp fixing assemblies 41a and 41b arranged facing each other, first and second upper lamp fixing assemblies 43a and 43b arranged facing each other, and conductive layers 47a, 47b, 47c, and 47d formed along sides of the lamp fixing assemblies 41a, 41b, 43a, and 43b. The fluorescent lamps 31 may be EEFL lamps and may have external electrodes 33 and 33a, and insulating layers 32 at both ends thereof.

In addition, the first and second lower lamp fixing assemblies 41a and 41b may face each other at a predetermined interval to correspond to a length of the fluorescent lamps 31, and may have a plurality of grooves 45 formed along the sides thereof. Further, the first and second upper lamp fixing assemblies 43a and 43b may be arranged at the same predetermined interval as the first and second lower lamp fixing assemblies 41a and 41b, and may have a plurality of grooves 45a formed along the sides thereof to correspond the grooves 45. The grooves 45 and 45a may be formed such that the fluorescent lamps 31 completely penetrate the first and second upper and lower lamp fixing assemblies 43a, 43b, 41a, and 41b. Also, the grooves 45 may accommodate about half of the diameter of the fluorescent lamps 31 and the grooves 45a may accommodate the remaining half of the diameter of the fluorescent lamp 31. Accordingly, the ends of the fluorescent lamps 31 may be securely fixed within the grooves 45 and 45a of the lower and upper lamp fixing assemblies 41a, 41b, 43a, and 43b, as shown in FIG. 4B, thereby making the installment/replacement of the fluorescent lamps 31 easier.

In addition, as shown in FIG. 4B, the conductive layers 47a, 47b, 47c, and 47d may contact the ends of the fluorescent lamps 31 for applying a power to the fluorescent lamps 31. The conductive layers 47a, 47b, 47c, and 47d may be formed by filling a conductive material inside a trench along the sides of the lower and upper lamp fixing assemblies 41a, 41b, 43a, and 43b. Alternatively, the conductive layers 47a, 47b, 47c, and 47d may be formed by coating a conductive material on a surface of the lower and upper lamp fixing assemblies 41a, 41b, 43a, and 43b. Also, a connector 61 may connect the conductive layers 47a, 47b, 47c, and 47d to a driving circuit (not shown) for driving and supplying a power to the fluorescent lamps 31. Accordingly, the number of connectors used within the backlight device may be reduced and the interconnection between the fluorescent lamps and the driving circuit may be simplified.

As shown in FIG. 4C, the first and second upper lamp fixing assemblies 43a and 43b may have a tapering width, wherein the width of the surfaces contacting the lower lamp fixing assemblies 41a and 41b may be larger than a width A of the opposing surfaces. For example, the first and second lamp fixing assemblies 43a and 43b may have an inclined angle θ of about 10° to about 30°. Also, the external electrodes 33 and 33a may be partially exposed within an effective luminous area, and the partially exposed portions may have a length X. The length X may depend on the incline angle θ and a height h of the first upper and lower lamp fixing assemblies 43a and 41a or of the second upper and lower lamp fixing assemblies 43b and 41b. For example, the exposed length X of the electrodes 33 and 33a may be within about 35% of the height h of the first and second upper and lower lamp fixing assemblies 43a, 43b, 41a, and 41b, i.e., x≦0.35h. If the incline angle θ is set at a range of about 20–24°, the length X may correspond to about 20% of the height h, i.e., X=0.2h. Accordingly, the width A of the first and second upper lamp fixing assemblies 43a and 43b may be reduced and the luminance at both ends of the fluorescent lamps 31 may be enhanced without diminishing quality of image within the effective luminous area.

Furthermore, the partially exposed portions of the external electrodes 33 and 33a may be covered with the insulating layer 32 to avoid formation of a dark line around ends of the fluorescent lamps 31 caused by oxidization of the external electrodes 33 and 33a. For example, the insulating layer 32 may be made of a white insulating material.

In FIG. 4C, the backlight device may further include a non-luminous area, wherein luminance within the area drops to a value of less than about ½ of the luminance of an effective luminous area of the device. Generally, the non-luminous area of a unit fluorescent module is influenced by the width A of an upper surface of the upper lamp fixing assemblies 43a and 43b, such that the narrower the width A is, the smaller the non-luminous area. Accordingly, it is possible to decrease the width A by exposing the electrodes 33 and 33a outside the upper and lower lamp fixing assemblies 43a, 43b, 41a, and 41b, and by covering the exposed portion of the electrodes 33 and 33a with the insulating film 32. Further, it is possible to lengthen the electrodes 33 and 33a, thereby reducing the amount and the frequency of driving voltage applied thereto. With a reduced amount of driving voltage, less heat may be generated and the life of the fluorescent lamp may be extended.

In addition, the backlight device may further include a light scattering member (not shown), such as a diffusion sheet or a diffusion plate, arranged above the first and second upper lamp fixing assemblies 43a and 43b for uniformly distributing light emitted from the fluorescent lamps 31 onto a LCD panel (not shown). The backlight device may also include a reflection plate (not shown) arranged below the first and second lower lamp fixing assemblies 41a and 41b for directing light emitted from the fluorescent lamps 31 onto a center portion of the LCD panel. In addition, the height h of the upper and lower lamp fixing assemblies 43a, 43b, 41a, and 41b may be defined by a length from an upper surface of the reflection plate to a lower surface of the light scattering member.

Figure 5A:
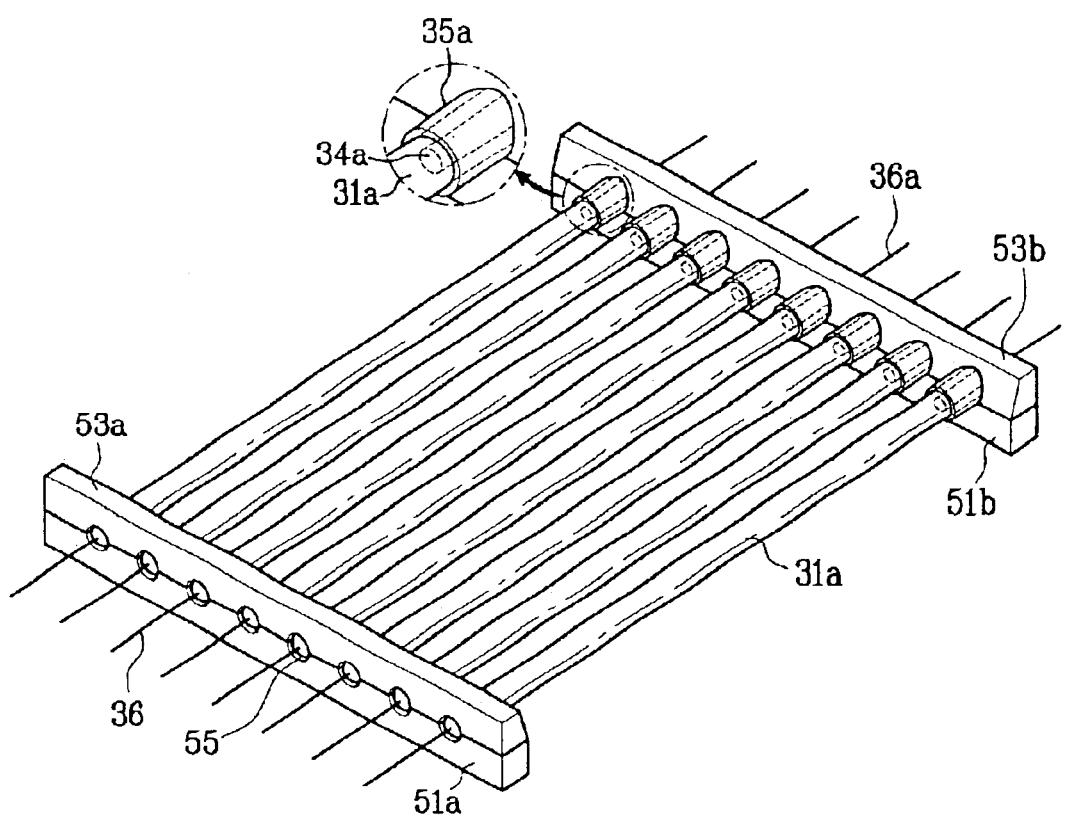
FIG. 5A is a perspective view of another exemplary direct-type backlight device according to the present invention.
Figure 5B:
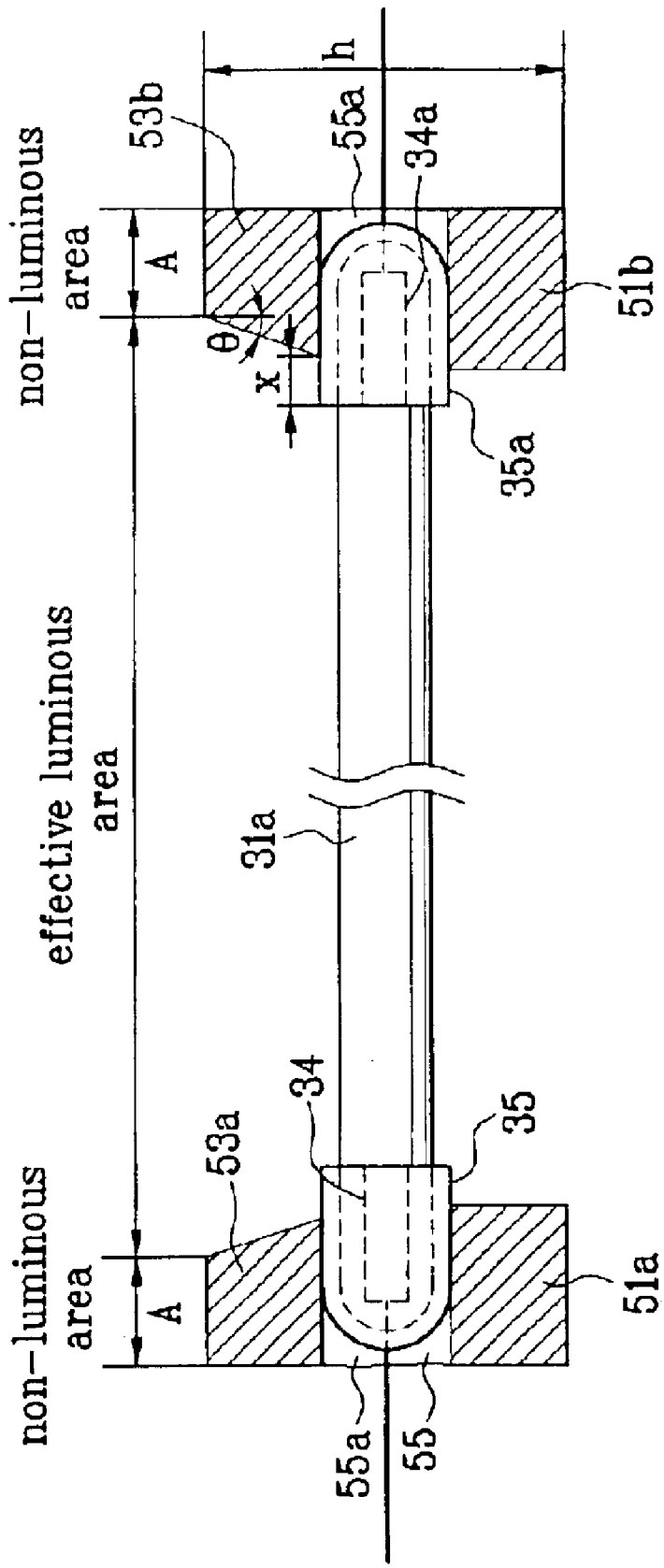
FIG. 5B is a cross-sectional view of the exemplary backlight device illustrated in FIG. 5A.

FIG. 5A is a perspective view of another exemplary direct-type backlight device according to the present invention, and FIG. 5B is a cross-sectional view of the exemplary backlight device illustrated in FIG. 5A. In FIG. 5A, a backlight device may include a plurality of fluorescent lamps 31a arranged parallel to each other, first and second lower lamp fixing assemblies 51a and 51b arranged facing each other, first and second upper lamp fixing assemblies 53a and 53b arranged facing each other, and power-incoming lines 36 and 36a. The fluorescent lamps 31a may be CCFL lamps and may have internal electrodes 34 and 34a at both ends thereof. In addition, the fluorescent lamps 31a may have a plurality of lamp holders 35 and 35a formed at both ends of the fluorescent lamps 31a for holding the internal electrodes 34 and 34a and the power incoming lines 36 and 36a. Furthermore, the power-incoming lines 36 and 36a may connect the electrodes 34 and 34a to a driving circuit (not shown) via a single connector (not shown) for driving and supplying a power to the fluorescent lamps 31a. Accordingly, the number of connectors used within the backlight device may be reduced and the interconnection between the fluorescent lamps and the driving circuit may be simplified.

In addition, the first and second lower lamp fixing assemblies 51a and 51b may face each other at a predetermined interval to correspond to a length of the fluorescent lamps 31a, and may have a plurality of grooves 55 formed along the sides thereof. Further, the first and second upper lamp fixing assemblies 53a and 53b may be arranged at the same predetermined interval as the first and second lower lamp fixing assemblies 51a and 51b, and may have a plurality of grooves 55a formed along the sides thereof to correspond the grooves 55. The grooves 55 and 55a may be formed such that the fluorescent lamps 31a completely penetrate the first and second upper and lower lamp fixing assemblies 53a, 53b, 51a, and 51b. Also, the lamp holders 35 and 35a may have the same diameter, such that the grooves 55 may accommodate about half of the diameter of the lamp holders 35 and 35a, and the grooves 55a may accommodate the remaining half of the diameter of the lamp holders 35 and 35a. Accordingly, the ends of the fluorescent lamps 31a may be securely fixed within the grooves 55 and 55a of the lower and upper lamp fixing assemblies 51a, 51b, 53a, and 53b, thereby making the installment/replacement of the fluorescent lamps 31a easier.

As shown in FIG. 5B, the first and second upper lamp fixing assemblies 53a and 53b may have a tapering width, wherein the width of the surfaces contacting the lower lamp fixing assemblies 51a and 51b may be larger than the width A of the opposing surfaces. For example, the first and second lamp fixing assemblies 53a and 53b may have an inclined angle θ of about 10° to about 30°. Also, the electrodes 34 and 34a may be partially exposed within an effective luminous area, and the partially exposed portions may have a length X. The length X may depend on the incline angle θ and a height h of the first upper and lower lamp fixing assemblies 53a and 51a or of the second upper and lower lamp fixing assemblies 53b and 51b. For example, the exposed length X of the electrodes 34 and 34a may be within about 35% of the height h of the first and second upper and lower lamp fixing assemblies 53a, 53b, 51a, and 51b, i.e., X≦0.35h. If the incline angle θ is set at a range of about 20–24°, the length X may correspond to about 20% of the height h, i.e., X=0.2h. Accordingly, the width A of the first and second upper lamp fixing assemblies 53a and 53b may be reduced and the luminance at both ends of the fluorescent lamps 31a may be enhanced without diminishing quality of image within the effective luminous area.

The backlight device may further include a non-luminous area, wherein luminance within the area drops to a value of less than about ½ of the luminance of an effective luminous area of the device. Generally, the non-luminous area of a unit fluorescent module is influenced by the width A of an upper surface of the upper lamp fixing assemblies 53a and 53b, such that the narrower the width A is, the smaller the non-luminous area. Accordingly, it is possible to decrease the width A by exposing the electrodes 34 and 34a outside the upper and lower lamp fixing assemblies 53a, 53b, 51a, and 51b. Further, it is possible to lengthen the electrodes 34 and 34a, thereby reducing the amount and the frequency of driving voltage applied thereto. With a reduced amount of driving voltage, less heat may be generated and the life of the fluorescent lamp may be extended.

In addition, the backlight device may further include a light scattering member (not shown), such as a diffusion sheet or a diffusion plate, arranged above the first and second upper lamp fixing assemblies 53a and 53b for uniformly distributing light emitted from the fluorescent lamps 31a onto a LCD panel (not shown). The backlight device may also include a reflection plate (not shown) arranged below the first and second lower lamp fixing assemblies 51a and 51b for directing light emitted from the fluorescent lamps 31a onto a center portion of the LCD panel. In addition, the height h of the upper and lower lamp fixing assemblies 53a, 53b, 51a, and 51b may be defined by a length from an upper surface of the reflection plate to a lower surface of the light scattering means.

Figure 6A:
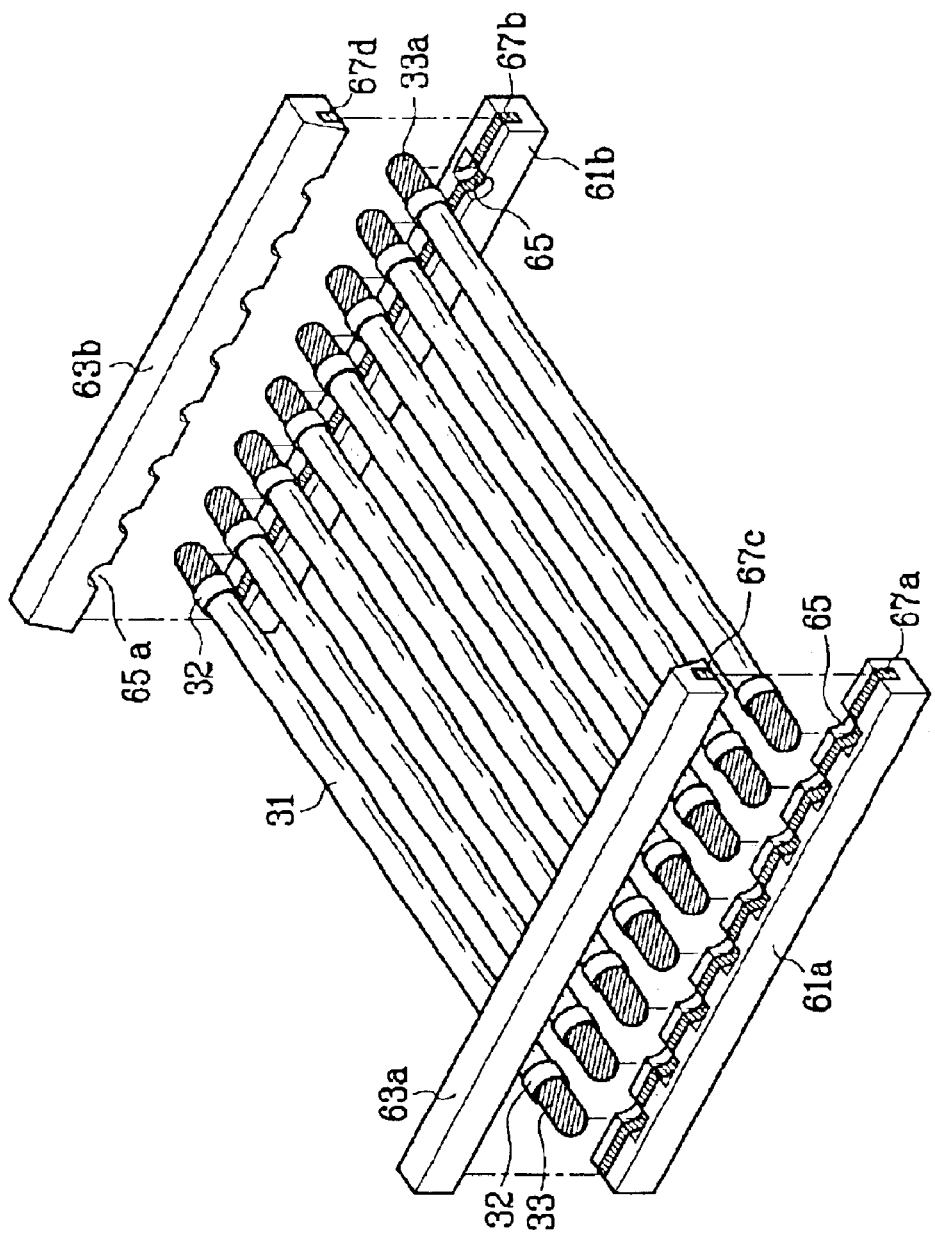
FIGS. 6A and 6B are perspective views of another exemplary direct-type backlight device according to the present invention.
Figure 6B:
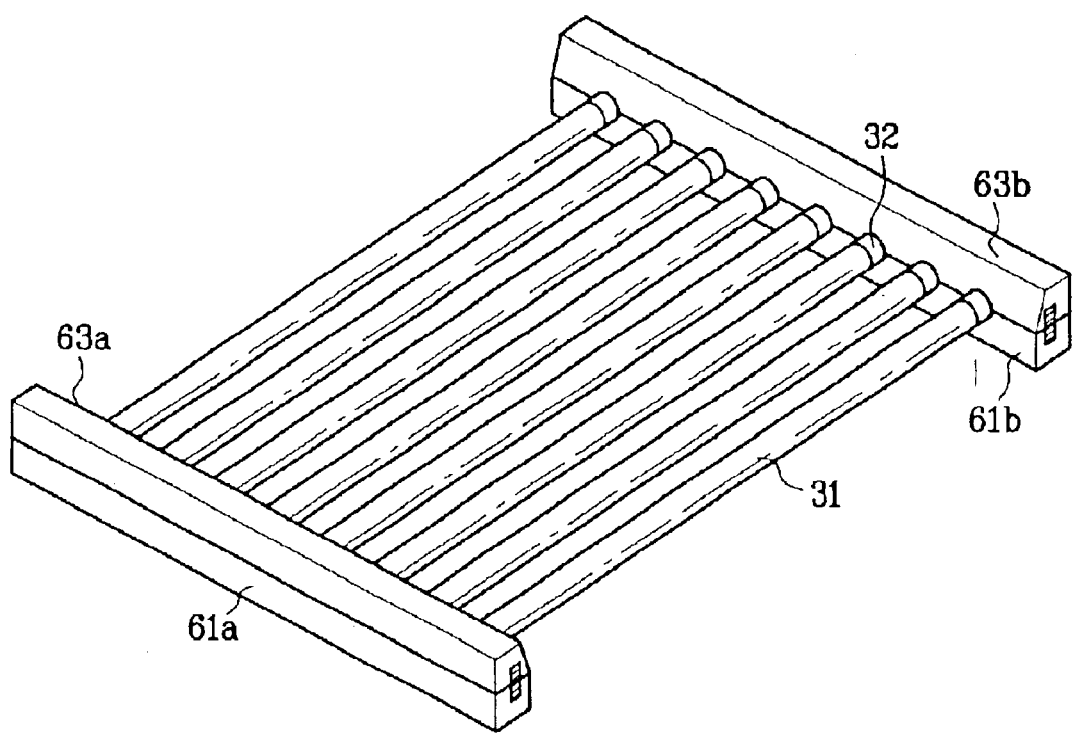
Figure 6C:
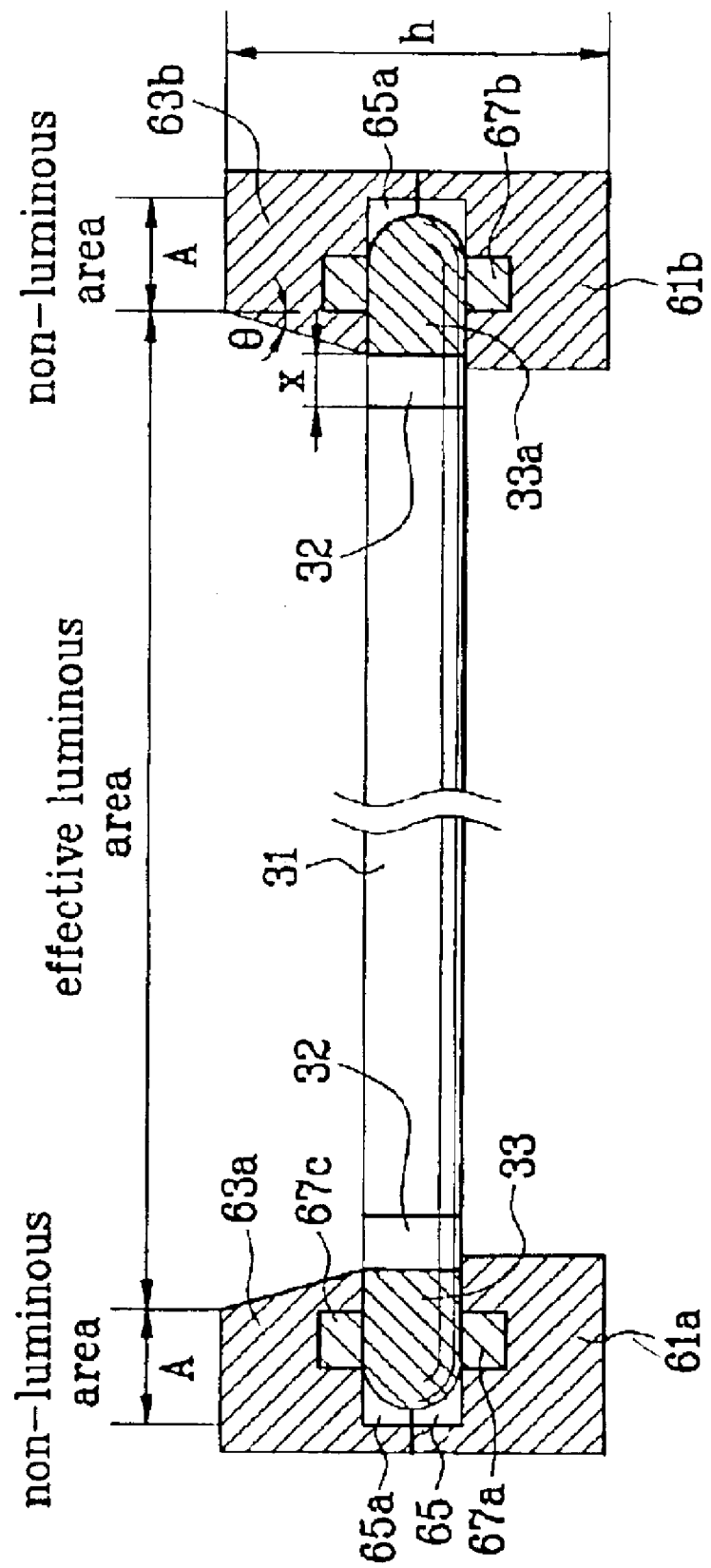
FIG. 6C is a cross-sectional view of the exemplary backlight device illustrated in FIG. 6B.

FIGS. 6A and 6B are perspective views of another exemplary direct-type backlight device according to the present invention, and FIG. 6C is a cross-sectional view of the exemplary backlight device illustrated in FIG. 6B. In FIG. 6A, a backlight device may include a plurality of fluorescent lamps 31 arranged parallel to each other, first and second lower lamp fixing assemblies 61a and 61b arranged facing each other, first and second upper lamp fixing assemblies 63a and 63b arranged facing each other, and conductive layers 67a, 67b, 67c, and 67d formed along the sides of the lamp fixing assemblies 61a, 61b, 63a, and 63b. The fluorescent lamps 31 may be EEFL lamps and may have external electrodes 33 and 33a, and insulating layers 32 at both ends thereof. Alternatively, the fluorescent lamps 31 may be replaced by the CCFL lamps 31a, shown in FIG. 3B, such that only the power-incoming lines 9 and 9a may be extended outside of the lamp fixing assemblies 61a, 61b, 63a, and 63b.

In addition, the first and second lower lamp fixing assemblies 61a and 61b may face each other at a predetermined interval to correspond to a length of the fluorescent lamps 31, and may have a plurality of grooves 65 formed along the sides thereof. Further, the first and second upper lamp fixing assemblies 63a and 63b may be arranged at the same predetermined interval as the first and second lower lamp fixing assemblies 61a and 61b, and may have a plurality of grooves 65a formed along the sides thereof to correspond the grooves 65. The grooves 65 and 65a may be formed such that the fluorescent lamps 31 only partially penetrate the first and second upper and lower lamp fixing assemblies 63a, 63b, 61a, and 61b. Also, the grooves 65 may accommodate about half of the diameter of the fluorescent lamps 31 and the grooves 65a may accommodate the remaining half of the diameter of the fluorescent lamp 31. Accordingly, the ends of the fluorescent lamps 31 may be securely fixed within the grooves 65 and 65a of the lower and upper lamp fixing assemblies 61a, 61b, 63a, and 63b, as shown in FIG. 6B, thereby making the installment/replacement of the fluorescent lamps 31 easier and reducing external impact on the fluorescent lamps 31.

As shown in FIG. 6C, the first and second upper lamp fixing assemblies 63a and 63b may have a tapering width, wherein the width of the surfaces contacting the lower lamp fixing assemblies 61a and 61b may be larger than a width A of the opposing surfaces. For example, the first and second lamp fixing assemblies 63a and 63b may have an inclined angle θ of about 10° to about 30°. Also, the external electrodes 63 and 63a may be partially exposed within an effective luminous area, and the partially exposed portions may have a length of X. The length X may depend on the incline angle θ and a height h of the first upper and lower lamp fixing assemblies 63a and 61a or of the second upper and lower lamp fixing assemblies 63b and 61b. For example, the exposed length X of the electrodes 33 and 33a may be within about 35% of the height h of the first and second upper and lower lamp fixing assemblies 63a, 63b, 61a, and 61b, i.e., X≦0.35h. If the incline angle θ is set at a range of about 20–24°, the length X may correspond to about 20% of the height h, i.e., X=0.2h. Accordingly, the width A of the first and second upper lamp fixing assemblies 63a and 63b may be reduced and the luminance at both ends of the fluorescent lamps 31 may be enhanced without diminishing quality of image within the effective luminous area.

The backlight device may further include a non-luminous area, wherein luminance within the area drops to a value of less than about ½ of the luminance of an effective luminance area of the device. Generally, the non-luminous area of a unit fluorescent module is influenced by the width A of an upper surface of the upper lamp fixing assemblies 63a and 63b, such that the narrower the width A is, the smaller the non-luminous area. Accordingly, it is possible to decrease the width A by exposing the electrodes 33 and 33a outside the upper and lower lamp fixing assemblies 63a, 63b, 61a, and 61b, and by covering the exposed portion of the electrodes 33 and 33a with the insulating film 32. Further, it is possible to lengthen the electrodes 33 and 33a, thereby reducing the amount and the frequency of driving voltage applied thereto. With a reduced amount of driving voltage, less heat may be generated and the life of the fluorescent lamp may be extended.

Figure 7A:
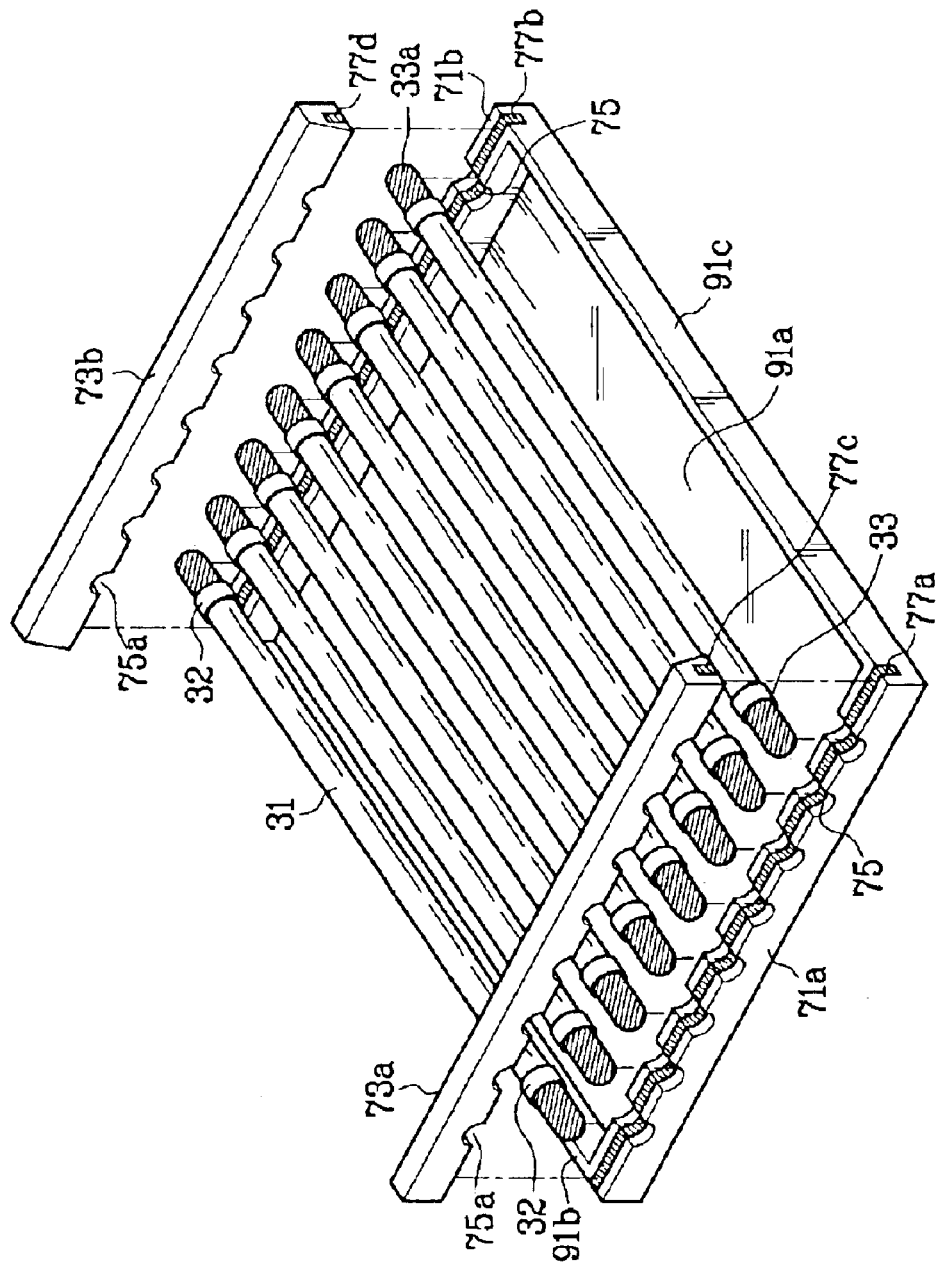
FIG. 7A is a perspective view of another exemplary direct-type backlight device according to the present invention.
Figure 7B:
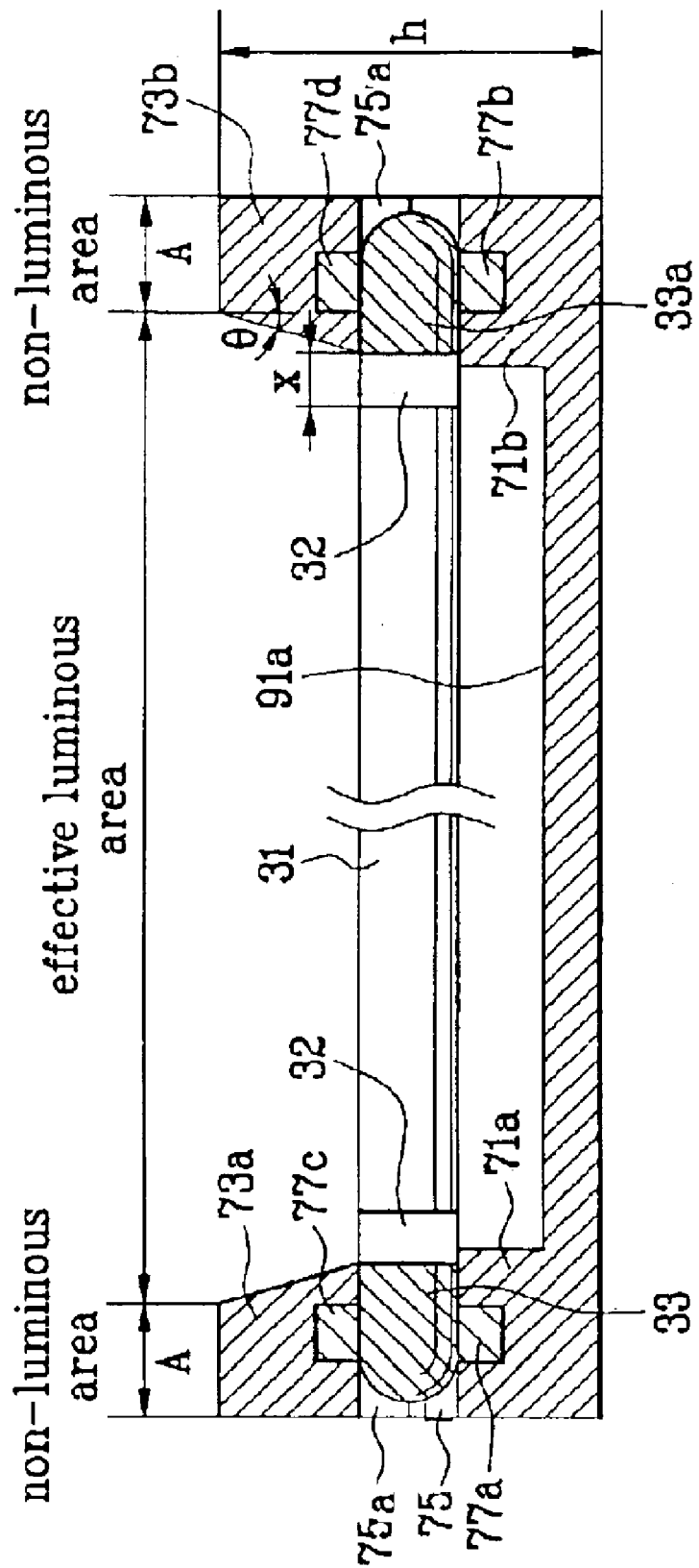
FIG. 7B is a cross-sectional view of the exemplary backlight device illustrated in FIG. 7A.

FIG. 7A is a perspective view of another exemplary direct-type backlight device according to the present invention, and FIG. 7B is a cross-sectional view of the exemplary backlight device illustrated in FIG. 7A. In FIG. 7A, a backlight device may include a plurality of fluorescent lamps 31 arranged parallel to each other, first and second lower lamp fixing assemblies 71a and 71b arranged facing each other, a lower supporting system 91a, 91b, and 91c formed between the lower lamp fixing assemblies 71a and 71b for supporting the lower assemblies 71a and 71b, first and second upper lamp fixing assemblies 73a and 73b arranged facing each other, and conductive layers 77a, 77b, 77c, and 77d formed along the sides of the lamp fixing assemblies 71a, 71b, 73a, and 73b. The fluorescent lamps 31 may be EEFL lamps and may have external electrodes 33 and 33a, and insulating layers 32 at both ends thereof. Alternatively, the fluorescent lamps 31 may be replaced by the CCFL lamps 31a, shown in FIG. 3B, such that only the power-incoming lines 9 and 9a may be extended outside of the lamp fixing assemblies 71a, 71b, 73a, and 73b.

The first and second lower lamp fixing assemblies 71a and 71b may also have a plurality of grooves 75 formed along the sides thereof. Further, the first and second upper lamp fixing assemblies 73a and 73b may have a plurality of grooves 75a formed along the sides thereof to correspond the grooves 75. The grooves 75 and 75a may be formed such that the fluorescent lamps 31 completely or partially penetrate the first and second upper and lower lamp fixing assemblies 73a, 73b, 71a, and 71b. Also, the grooves 75 may accommodate about half of the diameter of the fluorescent lamps 31 and the grooves 75a may accommodate the remaining half of the diameter of the fluorescent lamp 31. Accordingly, the ends of the fluorescent lamps 31 may be securely fixed within the grooves 75 and 75a of the lower and upper lamp fixing assemblies 71a, 71b, 73a, and 73b, as shown in FIG. 7B, thereby making the installment/replacement of the fluorescent lamps 31 easier.

In addition, the first and second lower lamp fixing assemblies 71 a and 71b may face each other at a predetermined interval to correspond to a length of the fluorescent lamps 31, and the lower supporting system 91a, 91b, and 91c. Furthermore, the first and second lower lamp fixing assemblies 71a and 71b may be integrally formed with the lower supporting system 91a, 91b, and 91c. Accordingly, the first and second lower lamp fixing assemblies 71a and 71b may be accurately arranged to securely affix the fluorescent lamps 31. Inner surfaces of the first and second lower assemblies 71a and 71b and the lower supporting systems 91a, 91b, and 91c may be formed of material having good light reflection ability, such as synthetic resin, to perform as a reflection plate. Alternatively, a reflective material may be coated onto the inner surfaces of the first and second lower assemblies 71a and 71b and the lower supporting systems 91a, 91b, and 91c. Accordingly, a reflection plate may be formed, thereby irradiating light emitted from the fluorescent lamps 31 toward a LCD panel (not shown).

Furthermore, the first and second upper lamp fixing assemblies 73a and 73b may have a tapering width, wherein the width of the surfaces contacting the lower lamp fixing assemblies 71a and 71b may be larger than a width A of the opposing surfaces. For example, the first and second lamp fixing assemblies 73a and 73b may have an inclined angle θ of about 10° to about 30°. Also, the external electrodes 33 and 33a may be partially exposed within an effective luminous area, and the partially exposed portions may have a length of X.

Figure 8B:
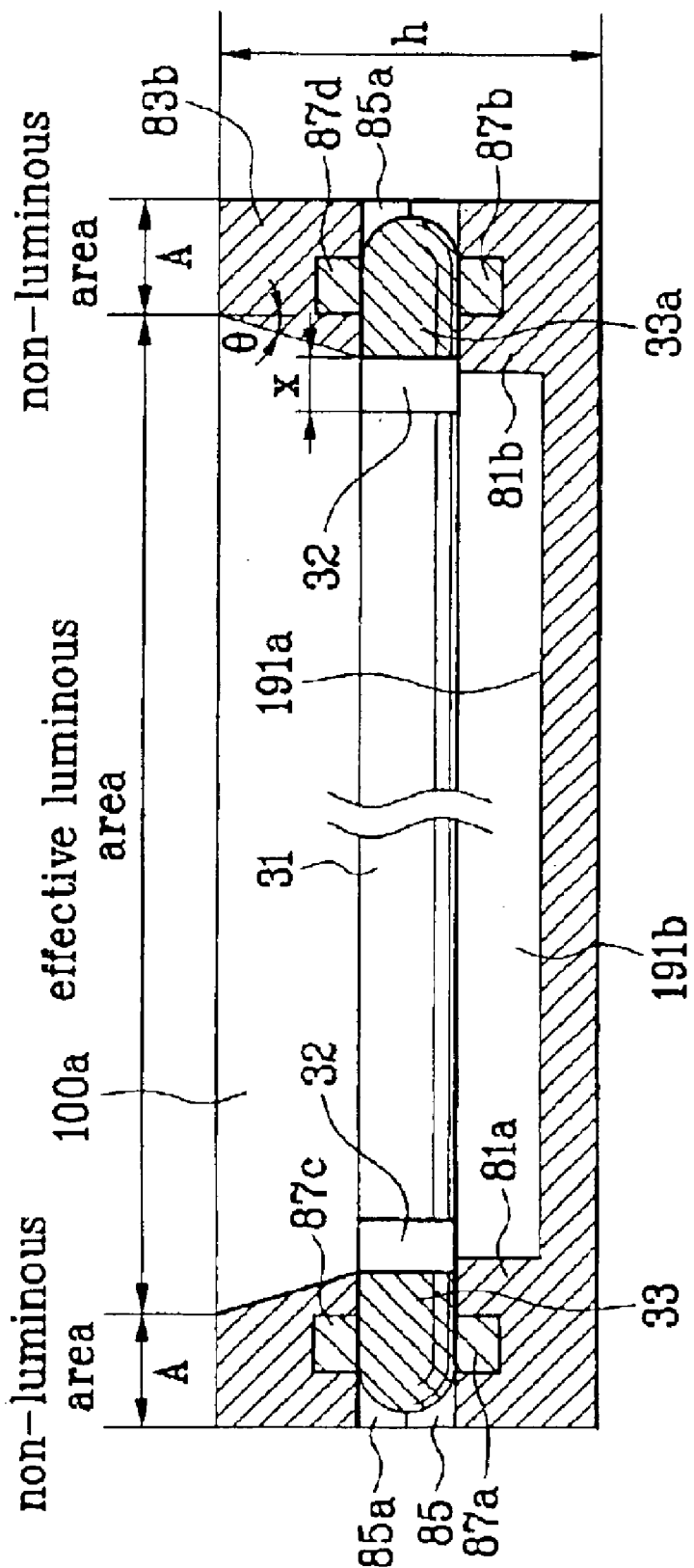
FIG. 8B is a cross-sectional view of the exemplary backlight device illustrated in FIG. 8A.

FIG. 8A is a perspective view of another exemplary direct-type backlight device according to the present invention, and FIG. 8B is a cross-sectional view of the exemplary backlight device illustrated in FIG. 8A. In FIG. 8A, a backlight device may include a plurality of fluorescent lamps 31 arranged parallel to each other, first and second lower lamp fixing assemblies 81a and 81b arranged facing each other, a lower supporting system 191a, 191b, and 191c formed between the lower lamp fixing assemblies 81a and 81b for supporting the lower assemblies 81a and 81b, first and second upper lamp fixing assemblies 83a and 83b arranged facing each other, an upper supporting system 100a and 100b formed between the upper lamp fixing assemblies 83a and 83b, and conductive layers 87a, 87b, 87c, and 87d formed along the sides of the lamp fixing assemblies 81a, 81b, 83a, and 83b. The fluorescent lamps 31 may be EEFL lamps and may have external electrodes 33 and 33a, and insulating layers 32 at both ends thereof. Alternatively, the fluorescent lamps 31 may be replaced by the CCFL lamps 31a, shown in FIG. 3B, such that only the power-incoming lines 9 and 9a may be extended outside of the lamp fixing assemblies 81a, 81b, 83a, and 83b.

The first and second lower lamp fixing assemblies 81a and 81b may also have a plurality of grooves 85 formed along the sides thereof. Further, the first and second upper lamp fixing assemblies 83a and 83b may have a plurality of grooves 85a formed along the sides thereof to correspond the grooves 85. The grooves 85 and 85a may be formed such that the fluorescent lamps 31 completely or partially penetrate the first and second upper and lower lamp fixing assemblies 83a, 83b, 81a, and 81b. Also, the grooves 85 may accommodate about half of the diameter of the fluorescent lamps 31 and the grooves 85a may accommodate the remaining half of the diameter of the fluorescent lamp 31. Accordingly, the ends of the fluorescent lamps 31 may be securely fixed within the grooves 85 and 85a of the lower and upper lamp fixing assemblies 81a, 81b, 83a, and 83b, as shown in FIG. 8B, thereby making the installment/replacement of the fluorescent lamps 31 easier.

In addition, the first and second lower lamp fixing assemblies 81a and 81b may face each other at a predetermined interval to correspond to a length of the fluorescent lamps 31, and the lower supporting system 191a, 191b, and 191c. Furthermore, the first and second lower lamp fixing assemblies 81a and 81b may be integrally formed with the lower supporting system 191a, 191b, and 191c. Accordingly, the first and second lower lamp fixing assemblies 81a and 81b may be accurately arranged to securely affix the fluorescent lamps 31. The first and second upper lamp fixing assemblies 83a and 83b may face each other at the same predetermined interval as the first and second lower lamp fixing assemblies 81a and 81b. Further, the first and second upper lamp fixing assemblies 83a and 83b may be integrally formed with the upper supporting system 100a and 100b. Accordingly, the first and second lower lamp fixing assemblies 83a and 83b may be accurately arranged to securely affix the fluorescent lamps 31.

Furthermore, the first and second upper lamp fixing assemblies 83a and 83b may have a tapering width, wherein the width of the surfaces contacting the lower lamp fixing assemblies 81a and 81b is larger than a width A of the opposing surfaces. For example, the first and second lamp fixing assemblies 83a and 83b may have an inclined angle θ of about 10° to about 30°. Also, the external electrodes 33 and 33a may be partially exposed within an effective luminous area, and the partially exposed portions may have a length of X.

The aforementioned backlight devices may be used as light sources at a rear side or a front side of a display, or as a light emitting device by themselves. The aforementioned backlight device of the present invention has the following effects. First, lamp electrodes may expose in an effective luminous area of the backlight device, thereby decreasing a width of the upper lamp fixing assemblies and enhancing efficiency of the device. Second, lamp electrodes may be lengthened, thereby lowering the driving voltage and extending the life of the fluorescent lamps. Third, the upper lamp fixing assemblies may have a tapering width, thereby widening the effective luminous area. Fourth, supporting systems for supporting the upper and lower lamp fixing assemblies may be formed, thereby accurately arranging the lamp fixing assemblies and securely affixing the fluorescent lamps.

It will be apparent to those skilled in the art that various modifications and variations can be made in the backlight device and the method of fabricating the same of the present invention without departing from the spirit or scope of the invention. Thus, it is intended that the present invention cover the modifications and variations of this invention provided they come within the scope of the appended claims and their equivalents.

What is claimed is:

1. A backlight device, comprising:
a plurality of fluorescent lamps each having a tube and lamp electrodes formed at opposing ends of the tube arranged parallel with each other along a first direction;
a lower lamp fixing assembly of a first height having a first plurality of grooves disposed along a second direction for holding the ends of the plurality of fluorescent lamps; and
an upper lamp fixing assembly of a second height, the upper lamp fixing assembly having a second plurality of grooves, a first end portion have a first width facing the lower lamp fixing assembly, and a second end portion having a second width smaller than the first width,
wherein portions of the ends of each of the tubes are exposed at an exterior of the lower and upper lamp fixing assemblies.

2. The backlight device according to claim 1, wherein the upper lamp fixing assembly includes an inclined sidewall between the first and second end portions having an incline angle within a range of about 10° to about 30°.

3. The backlight device according to claim 1, wherein the exposed portions of the ends of the tubes electrode have a length within about 35% of a sum of the first and second heights.

4. The backlight device according to claim 1, wherein the lamp electrode includes an external electrode.

5. The backlight device according to claim 4, wherein the exposed portions of the ends of the tubes is covered with an insulating film.

6. The backlight device according to claim 5, wherein the insulating film includes a white insulating material.

7. The backlight device according to claim 1, wherein the lamp electrode includes internal electrodes.

8. The backlight device according to claim 1, further comprising a plurality of lamp holders for interconnecting each of the lamp electrodes with a plurality of power lines.

9. The backlight device according to claim 1, further comprising a conductive layer formed within the upper and lower lamp fixing assemblies along the second direction.

10. The backlight device according to claim 9, wherein the conductive layer is filled within each of the first and second pluralities of grooves.

11. The backlight device according to claim 9, wherein the conductive layer includes a conductive material coated on surfaces of the upper and lower lamp fixing assemblies.

12. The backlight device according to claim 1, wherein the upper and lower lamp fixing assemblies are removable attached to each other.

13. The backlight device according to claim 1, wherein the first plurality of grooves completely penetrate through the lower lamp fixing assembly along the first direction.

14. The backlight device according to claim 1, wherein the first plurality of grooves partially penetrate through the lower lamp fixing assembly.

15. A backlight device, comprising:
a plurality of fluorescent lamps arranged in parallel with each other along a first direction, each having a tube and lamp electrodes formed at opposite ends of the tube to form an effective luminous area;
first and second lower lamp fixing assemblies arranged facing each other along a second direction at a first interval along the first direction corresponding to a length of the fluorescent lamps, each of the first and second lower lamp fixing assemblies have a first height and a first plurality of grooves for accommodating the opposite ends of the tubes; and
first and second upper lamp fixing assemblies each having a second plurality of grooves for affixing and supporting each of the fluorescent lamps, each of the first and second upper lamp fixing assemblies have a second height,
wherein the first and second upper lamp fixing assemblies are arranged at the first interval and each have a first end portion of a first width adjacent to one of the first and second lower lamp fixing assemblies and a second end portion of a second width smaller than the first width.

16. The backlight device according to claim 15, wherein the first and second upper assemblies each include an inclined sidewall between the first and second end portions having an incline angle within a range of about 10° to about 30°.

17. The backlight device according to claim 15, wherein each of the plurality of lamps include an exposed portion having a length within about 35% of a sum of the first and second heights.

18. The backlight device according to claim 17, wherein the exposed portion of the lamp electrode is covered with an insulating film.

19. The backlight device according to claim 18, wherein the insulating film includes a white insulating material.

20. The backlight device according to claim 15, wherein the lamp electrodes include an external electrode.

21. The backlight device according to claim 15, wherein the lamp electrode includes an internal electrodes.

22. The backlight device according to claim 15, further comprising a plurality of lamp holders for interconnecting the lamp electrodes to a plurality of power lines.

23. The backlight device according to claim 15, further comprising a conductive layer formed within the first and second upper and lower lamp fixing assemblies along the second direction.

24. The backlight device according to claim 23, wherein the conductive layer includes a conductive material filled within the first and second pluralities of grooves.

25. The backlight device according to claim 23, wherein the conductive layer includes a conductive material coated upper surfaces of the first and second upper and lower lamp fixing assemblies.

26. The backlight device according to claim 15, wherein the first and second upper and lower lamp fixing assemblies are removably connected together.

27. The backlight device according to claim 15, wherein the first and second pluralities of grooves completely penetrate through the first and second upper and lower lamp fixing assemblies along the first direction.

28. The backlight device according to claim 15, wherein the first and second pluralities of grooves partially penetrate through the first and second upper and lower lamp fixing assemblies along the first direction.

29. The backlight device according to claim 15, further comprising a lower supporting unit formed at side and lower portions of the first and second lower lamp fixing assemblies for supporting the first and second lower lamp fixing assemblies.

30. The backlight device according to claim 29, wherein the lower supporting unit includes a light-reflective material.

31. The backlight device according to claim 15, further comprising an upper supporting unit formed at both ends of the first and second upper lamp fixing assemblies for supporting the first and second upper lamp fixing assemblies.

32. A method of fabricating a backlight device, comprising the steps of:

arranging opposite ends of a plurality of fluorescent lamps within a first plurality of grooves of a lower lamp fixing assembly, each of the fluorescent lamps have lamp electrodes formed at opposite ends; and arranging an upper lamp fixing assembly having a second plurality of grooves to face the lower lamp fixing assembly to affix the opposite ends of each of the fluorescent lamps into the first and second pluralities of grooves, wherein portions of each of the fluorescent lamp electrodes are exposed at an exterior of the upper and lower lamp fixing assemblies.

33. The method according to claim 32, wherein the upper lamp fixing assembly includes a first end portion having a first width adjacent to the lower lamp fixing assembly and a second end portion having a second width smaller than the first width.

34. The method according to claim 33, wherein the upper lamp fixing assembly includes an inclined sidewall having an angle within a range of about 10° to about 30°.

35. The method of fabricating a backlight device according to claim 32, wherein the step of arranging opposite ends of the plurality of fluorescent lamps includes exposing a length portion of the lamp electrode such that the length portion is within about 35% of a total height of the first upper lamp fixing assembly and the first lower lamp fixing assembly.

* * * * *